(12) United States Patent     (10) Patent No.:   US 12,609,221 B2

Kelley et al.             (45) Date of Patent:      Apr. 21, 2026

(54) PLUG MOUNTED SURGE ARRESTER

(71) Applicant: S&C Electric Company, Chicago, IL (US)

(72) Inventors: Thomas S. Kelley, Highland Park, IL (US); Mark Francis Muir, Skokie, IL (US); Andrew B. Berman, Racine, WI (US); Xin Guo Zhu, Chicago, IL (US); Rahul Jain, Evanston, IL (US)

(73) Assignee: S&C Electric Company, Chicago, IL (US)

( * ) Notice: Subject to any disclaimer, the term of this patent is extended or adjusted under 35 U.S.C. 154(b) by 150 days.

(21) Appl. No.: 18/113,652

(22) Filed: Feb. 24, 2023

(65) Prior Publication Data

US 2023/0290545 A1     Sep. 14, 2023

Related U.S. Application Data

(60) Provisional application No. 63/318,179, filed on Mar. 9, 2022.

(51) Int. Cl.
| | |
|---|---|
| *H01C 7/12* | (2006.01) |
| *H01H 9/00* | (2006.01) |
| *H02B 1/18* | (2006.01) |

(52) U.S. Cl.
CPC .................. *H01C 7/12* (2013.01); *H01H 9/00* (2013.01); *H02B 1/18* (2013.01)

(58) Field of Classification Search
CPC ... H01C 7/12; H01H 9/00; H01H 9/12; H02B 1/18
USPC ........................................................ 361/117
See application file for complete search history.

(56) References Cited

U.S. PATENT DOCUMENTS

| | | | | | |
|---|---|---|---|---|---|
| 4,679,113 | A | * | 7/1987 | Book ........................ | H02B 1/18 |
| | | | | | 361/127 |
| 4,700,258 | A | * | 10/1987 | Farmer .................... | H01C 7/12 |
| | | | | | 439/429 |
| 5,128,824 | A | * | 7/1992 | Yaworski ................. | H01C 7/12 |
| | | | | | 361/127 |
| 5,912,792 | A | * | 6/1999 | Shirakawa ................ | H01T 4/08 |
| | | | | | 361/117 |

(Continued)

FOREIGN PATENT DOCUMENTS

| | | | | |
|---|---|---|---|---|
| KR | 101781116 | B1 | * | 9/2017 |

OTHER PUBLICATIONS

Connex M2016-017 EN Jul. 11, 2021 © Pfisterer Holding AG www.pfisterer.com (Year: 2021).*

*Primary Examiner* — Sreeya Sreevatsa

(57) ABSTRACT

A switch assembly including a switch and an interface physically coupled to the switch and configured to be physically coupled to an electrical component, such as a transformer. The switch assembly also includes an interface having electrical hardware electrically coupled to the switch and configured to be electrically coupled to the component. The switch assembly further includes a surge arrester having an insulation member, a grounding jacket formed over a portion of the insulation member and a conductor extending through the insulation member and being electrically coupled to the hardware and the grounding jacket. The interface further includes a releasable connector that is electrically coupled to the conductor and allows the surge arrester to be disconnected from the interface.

15 Claims, 3 Drawing Sheets

(56) References Cited

U.S. PATENT DOCUMENTS

| | | | |
|---|---|---|---|
| 2007/0141882 A1* | 6/2007 | Stepniak ................ | H01R 13/53 |
| | | | 439/187 |
| 2007/0297114 A1* | 12/2007 | Woodworth ........... | H01C 7/126 |
| | | | 361/118 |
| 2015/0036255 A1* | 2/2015 | Klein ..................... | H02H 9/045 |
| | | | 361/118 |
| 2022/0020513 A1* | 1/2022 | Kumar ................... | H01C 1/028 |

\* cited by examiner

PLUG MOUNTED SURGE ARRESTER

BACKGROUND

This application claims the benefit of priority from the U.S. Provisional Application No. 63/318,179, filed on Mar. 9, 2022, the disclosure of which is hereby expressly incorporated herein by reference for all purposes.

BACKGROUND

Field

The present disclosure relates generally to a plug-mounted surge arrester and, more particularly, to a plug-mounted surge arrester used in connection with an interface associated with a bushing well interrupter assembly.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeder lines that carry the same current but are 120° apart in phase. three-phase and single-phase lateral lines are tapped off of the feeder that provide the medium voltage to various distribution transformers, where the voltage is stepped down to a low voltage and is provided to loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the load on the network, which may cause the current flow from the substation to significantly increase, for example, many times above the normal current, along the fault path. This amount of current causes the electrical lines to significantly heat up and possibly melt, and also could cause mechanical damage to various components in the substation and in the network. Power distribution networks of the type referred to above often include switching devices, breakers, reclosers, interrupters, etc. that control the flow of power throughout the network and may be used to isolate faults within a faulted section of the network.

As part of their power distribution network, many utility companies employ underground single-phase lateral circuits that feed residential and commercial customers. Often these circuits are configured in a loop and fed from both ends, where an open location, typically at a transformer, is used in the circuit to isolate the two power sources. Although providing underground power cables protects circuits from faults created by things like storms and vegetation growth, underground cables still may break or otherwise fail as a result of corrosion and other things.

For a residential loop circuit of the type referred to above having two power sources, it is usually possible to reconfigure the open location in the circuit so that loads that are affected by a failed cable are fed by the other source and service to all of the loads is maintained. However, known processes for identifying the location of a cable failure and the subsequent reconfiguration of the open location often result in long power restoration times because workers are required to physically go to the transformers to test for power and then reconfigure the transformers to change the open location. It has been proposed to provide bushing well interrupter devices in the existing transformers for these types of loop circuits that provide automatic protection, isolation and restoration of underground residential cable loops and methods to switch cable segments without handling cable elbows.

These residential loop circuits require surge arresters, especially in the outer limits of the circuit. Existing surge arresters for these circuits include elbow mounted devices that interface with load-break interfaces for use in dead front switchgear and overhead surge arresters having bare cable connections for use in live front switchgear. The use of bushing well interrupter devices in these circuits offers the potential for a reconfigured and more efficient surge arrester.

SUMMARY

The following discussion discloses and describes a switch assembly including a switch and an interface physically coupled to the switch and configured to be physically coupled to an electrical component, such as a transformer. The switch assembly also includes an interface having electrical hardware electrically coupled to the switch and configured to be electrically coupled to the component. The switch assembly further includes a surge arrester having an insulation member, a grounding jacket formed over a portion of the insulation member and a conductor extending through the insulation member and being electrically coupled to the hardware and the grounding jacket. The interface further includes a releasable connector that is electrically coupled to the conductor and allows the surge arrester to be disconnected from the interface.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a plug-mounted surge arrester is merely exemplary in nature and is in no way intended to limit the invention or its applications or uses. For example, the plug-mounted surge arresters discussed herein have particular application for being employed in a transformer interface associated with a bushing well interrupter assembly that is part of a transformer employed in underground residential loop circuits. However, the plug-mounted surge arrester may have other applications.

Figures 1, 2:
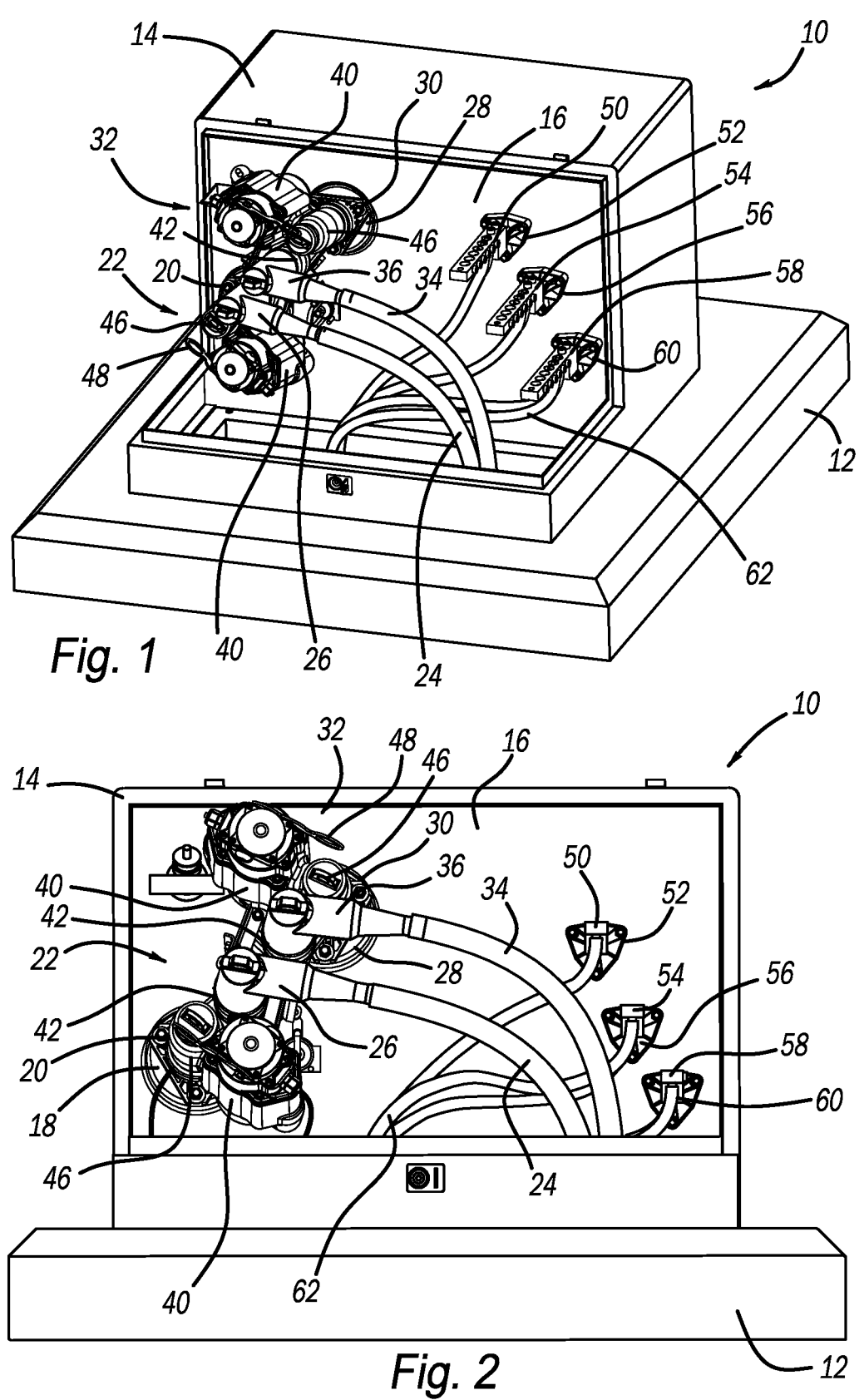
FIG. 1 is an isometric view of a pad mounted transformer employed in an underground residential loop circuit.
FIG. 2 is a front view of the transformer shown in FIG. 1.

FIG. 1 is an isometric view and FIG. 2 is a front view of a transformer 10 of the type that is mounted on a pad 12 that may be employed in an underground single-phase lateral loop circuit that feeds residential and commercial customers. The transformer 10 includes an enclosure 14 that houses the transformer primary and secondary coils (not shown) and other electrical components (not shown) of the transformer 10. A cover of the enclosure 14 has been removed to expose a panel 16 in the enclosure 14. A connector bushing 20 positioned within and coupled to a bushing well 18 extends through the panel 16 that accepts a bushing well interrupter assembly 22 that connects a power line 24 having an elbow connector 26 to one side of the primary coil and a connector bushing 30 positioned within and coupled to a bushing well 28 extends through the panel 16 that accepts a bushing well interrupter assembly 32 that connects a power line 34 having an elbow connector 36 to the other side of the primary coil, where the bushing well interrupter assemblies 22 and 32 are configured to provide automatic protection, isolation and power restoration of a lateral loop circuit without handling cable elbows. It is noted that the assemblies 22 and 32 are mirror images of each other to accommodate spacing for the existing features on the transformer 10. The bushing well interrupter assemblies 22 and 32 each include a manual handle 48, a load-break interface 42, a transformer interface 46. A 120 V positive connector 50 is coupled to the secondary coil through a connector bushing 52 in the panel 16, a 120 V negative connector 54 is coupled to the secondary coil through a connector bushing 56 in the panel 16, and a neutral connector 58 is coupled to the secondary coil through a connector bushing 60 in the panel 16. Customer service lines 62 are connected to the connectors 50, 54 and 58 to deliver low voltage power to the desired number of loads (not shown). In this example, the lines 24, 34 and 62 run underground.

Figure 3:
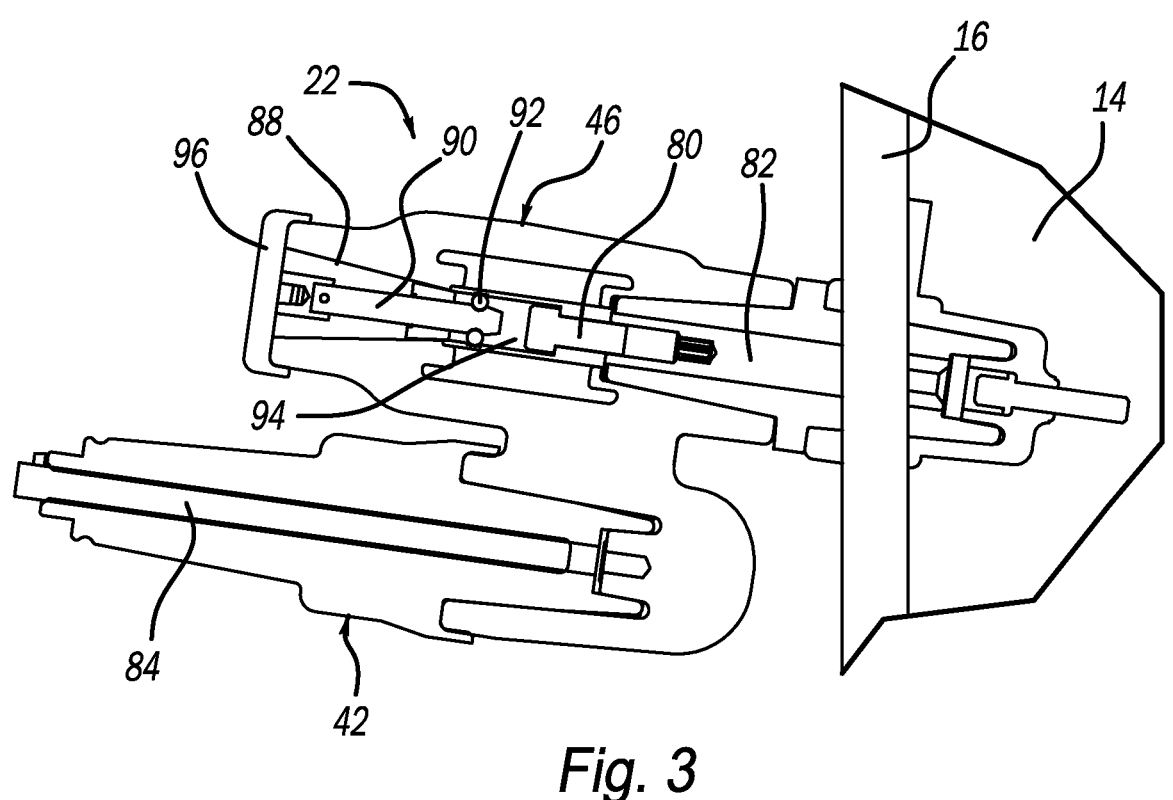
FIG. 3 is a cross-sectional view of a portion of a bushing well interrupter assembly shown in FIGS. 1 and 2 including a transformer interface having an insulating plug.

FIG. 3 is a cross-sectional view of a portion of the bushing well interrupter assembly 22. The transformer interface 46 includes coupling hardware having a conductive rod 80 and an adapter 82 that electrically couples the primary coil (not shown) in the transformer 10 to a power line 84 in the load-break interface 42 through the bushing well interrupter assembly 22. An insulating plug 88 is inserted into the transformer interface 46 and is coupled to the conductive rod 80 by an insulating fiberglass rod 90 extending through the plug 88 and a cylindrical rod 94 through a releasable connector 92 including an annular rim formed to an inside of the rod 94 and an annular recess in the rod 90, sometimes known as a Balseal garter spring, providing a snap fit connection. The plug 88 is made of an EPDM rubber and is tapered to match the geometry of the interface 46, where the rod 90 and the plug 88 are chemically bonded. A removable grounded cap 96 covers the plug 88, where the grounded cap 96 would be electrically coupled to ground by, for example, a wire (not shown). The cap 96 and the plug 92 can be removed from the transformer interface 46 by disconnecting the releasable connector 92 to gain access to the coupling hardware.

Figure 4:
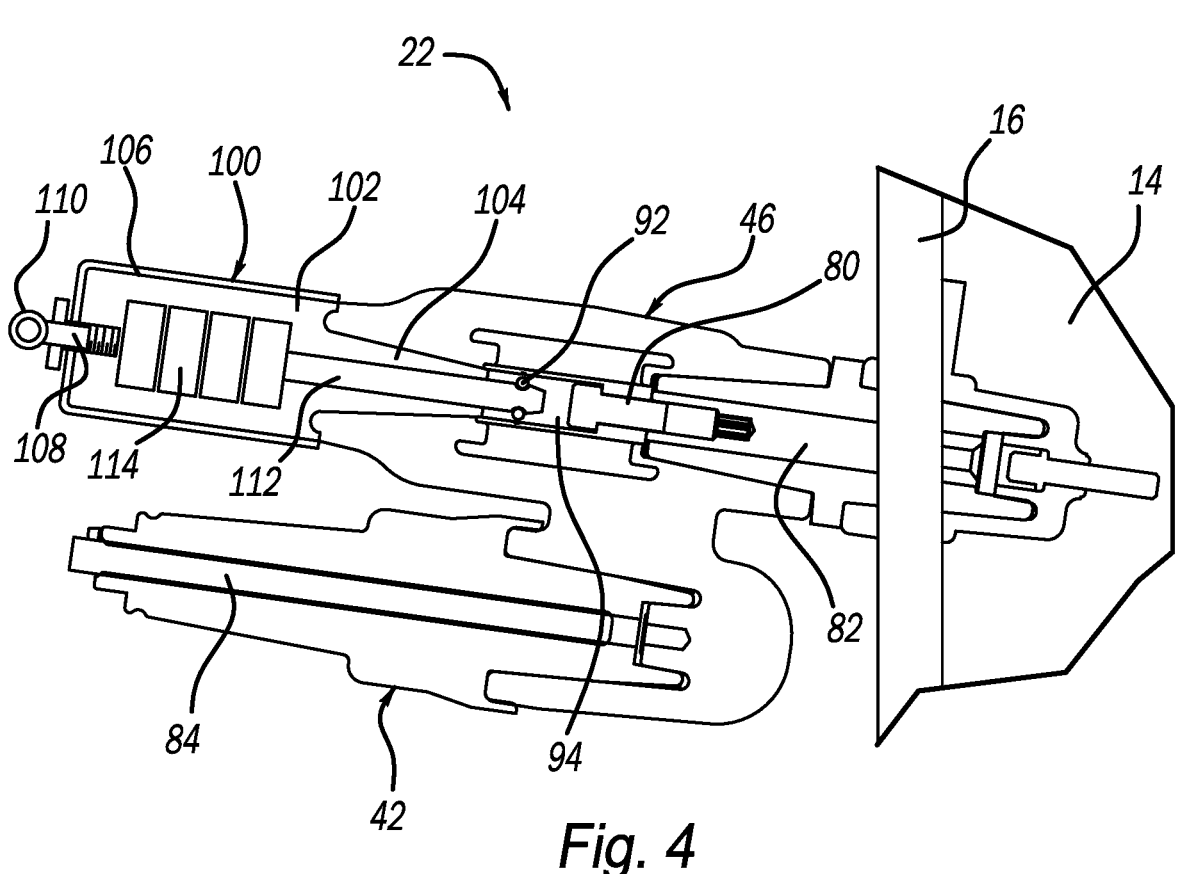
FIG. 4 is a cross-sectional view of the portion of the bushing well interrupter assembly shown in FIG. 3 with the insulating plug replaced with a plug-mounted surge arrester.
Figure 5:
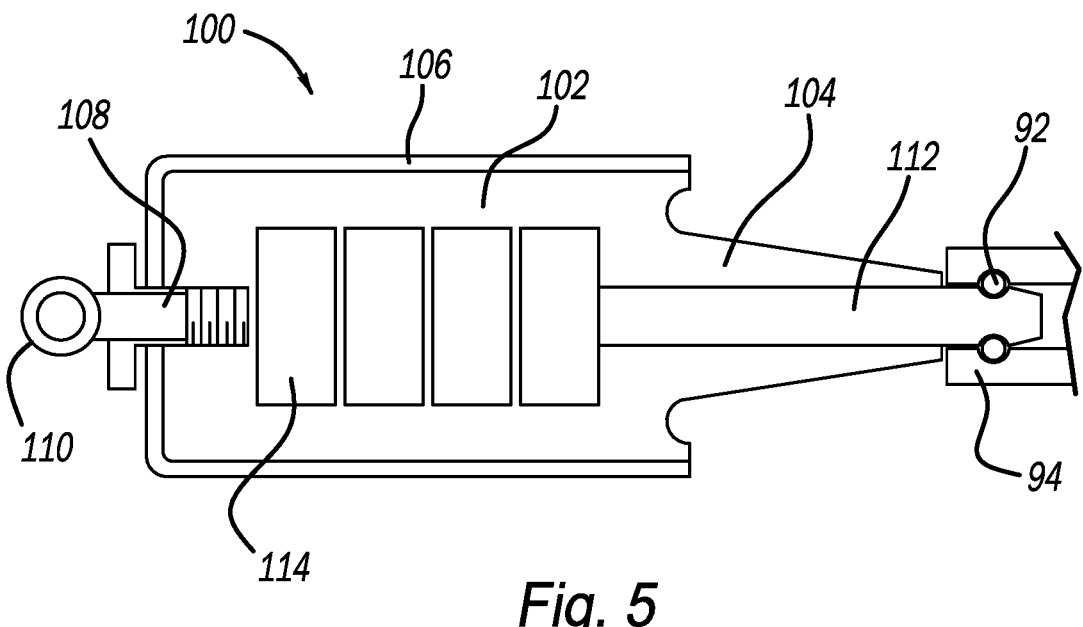
FIG. 5 is a cross-sectional view of the plug-mounted surge arrester separated from the bushing well interrupter assembly.

FIG. 4 is a cross-sectional view of the bushing well interrupter assembly 22 as shown in FIG. 3, but where the insulating plug 88 and the grounded cap 96 have been replaced with a plug-mounted surge arrester 100. FIG. 5 is a cross-sectional view of the surge arrester 100 separated from the interface 46. The surge arrester 100 includes a cylindrical insulation 102 having a plug interface 104 that is the same size and shape as the plug 88, where the insulation 102 extends out of the interface 46. An outer grounded jacket 106 is bonded to the insulation 102 and is electrically coupled to a ground connector 108 having a pull hook 110 for removing the surge arrester 100 from the transformer interface 46, where the connector 108 would be electrically coupled to ground by, for example, a wire (not shown). A conductor 112 extends through the plug interface 104 and is electrically coupled to the conductor 94 through the connector 92. A series of spaced apart metal oxide varistor discs 114, here four, are molded into the insulation 102 and are electrically coupled to the ground connector 108 and the conductor 112. If a power surge occurs on the power line 84, it is sent through the discs 114 to ground.

Figure 6:
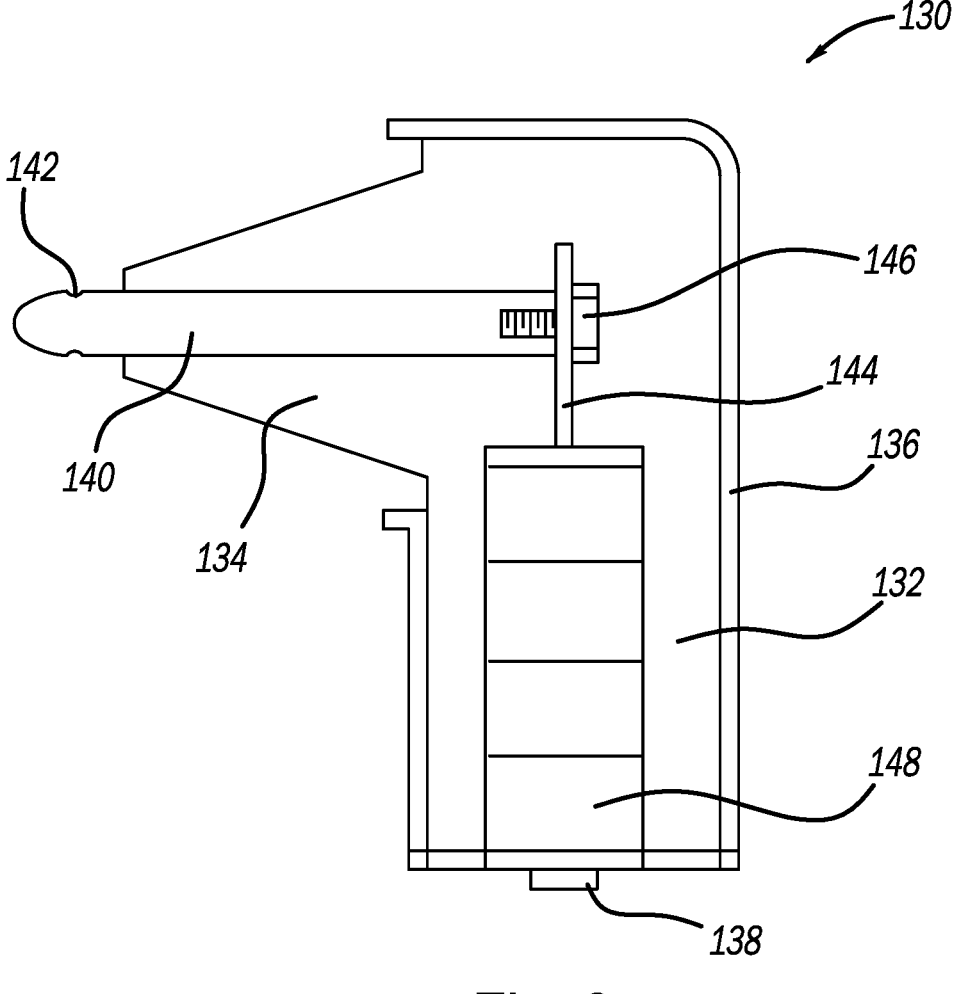
FIG. 6 is a cross-sectional view of an elbow shaped plug-mounted surge arrester.

FIG. 6 is a cross-sectional view of an elbow shaped plug-mounted surge arrester 130 that can be employed in these or other types of switching devices. The surge arrester 130 includes an L-shaped insulation 132 having a plug interface 134, where an outer grounded jacket 136 is bonded to the insulation 132 and is electrically coupled to a ground connector 138. A conductor 140 having an annular recess 142 for accepting a connector in a snap fit engagement extends into the plug interface 134 so that the recess 142 is exposed. The conductor 140 is electrically coupled to a conductor 144 by a lug connector 146 to provide the L-shape. The conductor 144 is electrically coupled to a series of metal oxide varistor discs 148 that are also electrically coupled to the ground connector 138.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A bushing well interrupter assembly comprising:
an insulation member configured to be inserted into a transformer interface including a grounding jacket formed over a portion of the insulation member;
the transformer interface configured to be physically coupled to the bushing well interrupter assembly and configured to be physically coupled to a transformer, the transformer interface including electrical hardware electrically coupled to the bushing well interrupter assembly and configured to be electrically coupled to the transformer and a snap-fit releasable connector that is electrically coupled to a conductor extending through the insulation member; and
a surge arrester disposed within the insulation member, the grounding jacket formed over a portion of the insulation member and the conductor extending through the insulation member and being electrically coupled to the hardware and the grounding jacket, wherein the releasable connector allows the surge arrester to be disconnected from the transformer interface.

2. The bushing well interrupter assembly according to claim 1 wherein the insulation member includes a tapered portion that extends into the interface, the conductor extending through and out of the tapered portion.

3. The bushing well interrupter assembly according to claim 1 wherein the insulation member is cylindrical.

4. The bushing well interrupter assembly according to claim 1 wherein the insulation member is L-shaped.

5. The bushing well interrupter assembly according to claim 1 wherein the surge arrester includes a ground connector electrically coupled to the grounding jacket and including a pull hook.

6. The bushing well interrupter assembly according to claim 1 wherein the surge arrestor includes a plurality of metal oxide varistor discs electrically formed in the insulation member and being coupled between the grounding jacket and the conductor.

7. A bushing well interrupter assembly having a plug-mounted surge arrester comprising:

an insulation member configured to be inserted into a transformer interface;

a grounding jacket formed over a portion of the insulation member;

a conductor extending through the insulation member and being electrically coupled to the grounding jacket;

a snap fit releasable connector electrically coupled to the conductor, allowing the surge arrester to be disconnected from the transformer interface;

a series of metal oxide varistor discs molded into the insulation member and electrically coupled between the conductor and the grounding jacket, wherein the plug-mounted surge arrester is configured to protect an electrical component from power surges by directing excess electrical energy through the series of metal oxide varistor discs to ground.

8. The bushing well interrupter assembly according to claim 7, wherein the insulation member is cylindrical in shape.

9. The bushing well interrupter assembly according to claim 7, wherein the insulation member includes a tapered portion that extends into the transformer interface, with the conductor extending through and out of the tapered portion.

10. The bushing well interrupter assembly according to claim 7, wherein the snap fit releasable connector is a Balseal garter spring, providing a snap fit connection.

11. The bushing well interrupter assembly according to claim 7, further comprising a ground connector electrically coupled to the grounding jacket and including a pull hook for removing the plug-mounted surge arrester from the transformer interface.

12. The bushing well interrupter assembly according to claim 7, wherein the series of metal oxide varistor discs comprises four discs spaced apart within the insulation member.

13. The bushing well interrupter assembly according to claim 7, wherein the plug-mounted surge arrester is configured to be employed in a transformer interface associated with a bushing well interrupter assembly.

14. The bushing well interrupter assembly according to claim 7, wherein the grounding jacket is bonded to the insulation member.

15. The bushing well interrupter assembly according to claim 7, wherein the insulation member is made of EPDM rubber.

* * * * *